(12) United States Patent
Bonnet et al.

(10) Patent No.: US 8,265,353 B2
(45) Date of Patent: Sep. 11, 2012

(54) METHOD OF RECONSTRUCTING AN IMAGE ACQUIRED USING SEVERAL IMAGERY MODES

(75) Inventors: Stéphane Bonnet, Seyssinet-Pariset (FR); Pierre Grangeat, Saint Ismier (FR)

(73) Assignee: Intellectual Ventures fund 23 LLC, Las Vegas, NV (US)

( * ) Notice: Subject to any disclaimer, the term of this patent is extended or adjusted under 35 U.S.C. 154(b) by 298 days.

(21) Appl. No.: 10/955,037

(22) Filed: Sep. 30, 2004

(65) Prior Publication Data
US 2005/0285857 A1 Dec. 29, 2005

(30) Foreign Application Priority Data
Oct. 1, 2003 (FR) ...................................... 03 50631

(51) Int. Cl.
*G06K 9/00* (2006.01)
(52) U.S. Cl. ............ 382/128; 382/131; 345/420; 378/4; 378/21; 250/363.04; 600/427
(58) Field of Classification Search .................. 382/128; 345/420
See application file for complete search history.

(56) References Cited

U.S. PATENT DOCUMENTS

| | | | |
|---|---|---|---|
| 4,694,156 A * | 9/1987 | Swanberg | 250/214 RC |
| 5,621,532 A * | 4/1997 | Ooki et al. | 356/444 |
| 5,889,525 A * | 3/1999 | De Murcia et al. | 345/420 |
| 6,246,784 B1 * | 6/2001 | Summers et al. | 382/128 |
| 6,885,702 B1 * | 4/2005 | Goudezeune et al. | 375/240.12 |
| 7,695,683 B2 * | 4/2010 | Quan et al. | 422/504 |
| 2003/0004405 A1 * | 1/2003 | Townsend et al. | 600/407 |
| 2003/0212320 A1 * | 11/2003 | Wilk et al. | 600/407 |
| 2004/0105575 A1 * | 6/2004 | Ganz et al. | 382/128 |
| 2004/0141638 A1 * | 7/2004 | Acar et al. | 382/131 |
| 2004/0170246 A1 | 9/2004 | Koenig et al. | |
| 2004/0175832 A1 * | 9/2004 | Hui et al. | 436/8 |
| 2007/0177778 A1 * | 8/2007 | Massaro | 382/128 |

FOREIGN PATENT DOCUMENTS

| | | |
|---|---|---|
| EP | 1 087 337 | 3/2001 |
| EP | 1087337 A1 | 3/2001 |
| FR | 2736454 | 1/1997 |
| FR | 2826157 | 12/2002 |
| WO | WO-01/80184 | 10/2001 |
| WO | WO-0180184 A1 | 10/2001 |

OTHER PUBLICATIONS

Beyer, T. et al., "The use of X-ray CT for Attenuation Correction of PET Data", 1995, IEEE, vol. 4, p. 1573.*
Perona et al., "Scale-Space and Edge Detection using Anisotropic Diffusion," Jul. 1990, IEEE, vol. 12, pp. 629-639.*

(Continued)

*Primary Examiner* — John Lee
(74) *Attorney, Agent, or Firm* — Connolly Bove Lodge & Hutz LLP

(57) ABSTRACT

Measurements of a mobile object and particularly a living being are made using two techniques, normally radiation attenuation and radiation emission, in synchronization to provide images of the object state. Movement displacement fields from one phase to the next are estimated for both techniques, but the final images obtained by the emission technique are improved by the knowledge of the displacement field obtained by the other technique that is more precise.

18 Claims, 2 Drawing Sheets

OTHER PUBLICATIONS

Figure 1:
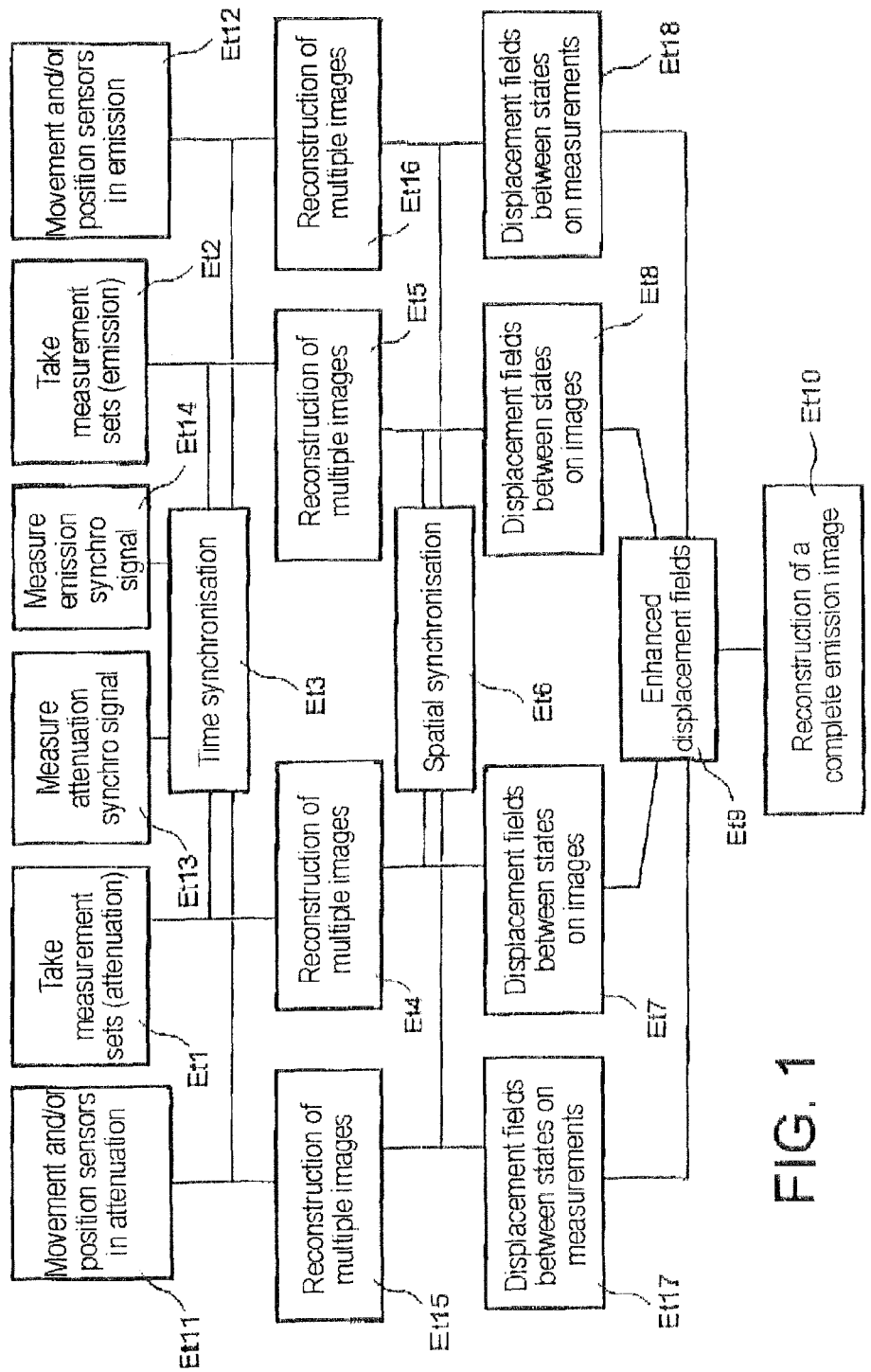

Gilland, David R.,et al.,"Simultaneous Reconstruction and Motion Estimation for Gated Cardiac ECT", IEEE Trans. on Nuclear Science 49(5):2344-2349 (Oct. 2002).

Grangeat, Pierre ,et al.,"Theoretical framework for a dynamic cone-beam reconstruction algorithm based on a dynamic particle model", Phys. Med. Biol. 47:2611-2625 (2002).

Kachelriess, Marc ,et al.,"Kymogram detection and kymogram-correlated image reconstruction from subsecond spiral computed tomography scans of the heart", Med. Phys. 29(7):1489-1503 (Jul. 2002).

Kinahan, P. E.,et al.,"Attenuation correction for a combined 3D PET/CT scanner", Med. Phys. 25(10):2046-2053 (Oct. 1998).

Timo Makela et al., "A Review of Cardiac Image Registration Methods," IEEE Transactions on Medical Imaging, IEEE Service Center, Piscataway, NJ, vol. 21, No. 9, Sep. 1, 2002.

Calvert et al., "Crossmodal identification," Trends in Cognitive Sciences, Elsevier Science, Oxford, GB, vol. 2, No. 7, Jul. 1, 1998, pp. 247-253.

J. Ashburner et al., "Multimodal image coregistration and partitioning—a unified framework," Neuroimage, vol. 6, No. 3, Oct. 1997, pp. 209-217.

* cited by examiner

METHOD OF RECONSTRUCTING AN IMAGE ACQUIRED USING SEVERAL IMAGERY MODES

This invention relates to a method in which an image of an object is estimated using two series of data that are combined by synchronisation.

Images may be taken inside objects, and particularly living beings, using several types of methods. Some are attenuative, in other words the attenuation of radiation passing through the object is measured, and others are emissive, in other words ionizing particles originating from a radioactive liquid previously swallowed by the organism to be studied, are collected. In both cases, detector networks rotating around the object or covering the periphery of the object collects radiation, and images of the object are obtained by combining measurements of detectors taken at different angles using well-known computed tomography methods (see "Tomography", directed by P. Grangeat Paris: Hermes Science Publications 2002 ISBN 2.7462-0356-1).

Some methods are better than others for obtaining specific result types. Typically, images obtained by attenuation can indicate the composition of the object at each location and thus enable an accurate drawing of the organs of a living being and their contours. This is not usually possible with images obtained by emission, but they can be used to distinguish healthy tissues that are only slightly emissive, from diseased tissues, for example cancers tissues that are strongly emissive. The first images can be qualified as anatomic and the second images as functional. They are complementary and superposition of the two images can be very helpful in the diagnostic. Prior art also includes devices for simultaneously acquiring both types of images (as in the article "Attenuation correction for a combined 3D PET/CT scanner" by Kinahan et al., Med. Phys. 25(10), October 1998, p. 2046-2053).

One purpose that should be considered applies to movements of living beings during the measurements. Obviously, the mix of measurements made while the object is moving can only produce blurred images, if no precautions are taken. Many studies have been carried out on this problem for several years, and several types of solutions have been suggested. Some consist of taking the measurements as quickly as possible, for example making use of a network of a large number of detectors that completely surround the object to be studied, instead of moving around the object. Another method consists of making the measurements only at an approximately invariable state of the object, for example for the same state of the heart or breathing cycle, or another periodic biological cycle. The first of these methods is obviously expensive in equipment and the second method is difficult to apply, and will not work for non-periodic movements (for example a moving animal). Another type of method involves digital correction of the measurements and images, taking account of displacements of the object between each series of measurements. Object movements are then estimated by displacement fields of their points. These displacement fields can be determined by making estimates on the first images, possibly including assumptions about the movements. The latter method is most likely to give good results. French patent 2 826 157 describes an example.

Image correction methods by estimating the displacement field have been applied primarily to attenuation images that can be taken quickly and for which the more distinct contents provide more details about object movements. Emission images have less abundant contents due to the fact that the measurements are more dispersed in time and they are not as easily recognizable since different categories of tissues are not as clearly distinguished. Therefore, it is difficult to establish a displacement field so that it can be used to compensate for object movements and regularize its image.

However, this document proposes to apply such an image reconstruction method to emission techniques, with compensation of object movements, using the methods described below Images of the object are taken using an emission technique and an attenuation technique. Ordinary movement estimating methods are applied to the images obtained by attenuation, by reconstituting a series of images of the object studied using measurement sets taken at different times and therefore providing blurred images if no movement compensation is made, due to the small movement of the object, but clearly representative of the state of the object at different times. The result is displacement fields of points on the object to obtain these first images.

These displacement fields are then applied to measurements taken using the emission technique in general after having been modified or adapted by processes that will be described in detail in the remainder of this document. Thus, these emission measurements may be corrected to compensate for the movement and obtain an improved final functional image. All that is necessary is to synchronize measurements made using the two techniques on a common time base.

Known installations in which both types of images were obtained do not use any analogue combination of measurement sets, and make use of a simple juxtaposition of two types of images obtained independently by superposition, or at the most use the attenuation image for a correction of another type of emission measurements, compensating for attenuations through the object being studied, which also affect these measurements.

Although the invention is useful at the moment in the special context of acquisition pairs by attenuation and emission, it could be easily be generalized to include any pair of measurement acquisitions and is not limited to the embodiments described below.

Figure 2:
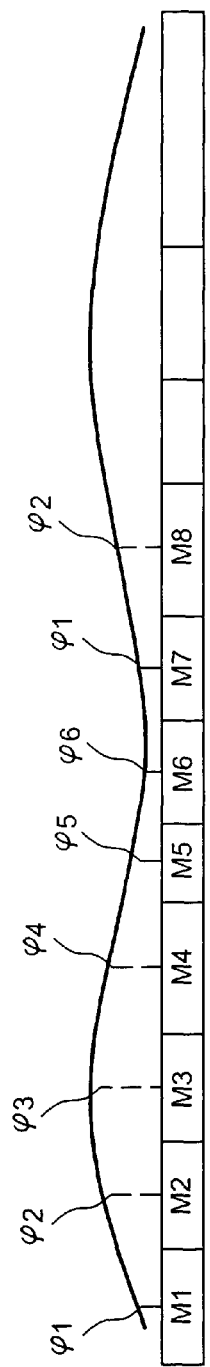

We will now describe the invention in more detail with reference to the attached figures, in which FIG. 1 is a general flowchart and FIG. 2 is a time diagram.

This invention is particularly applicable to medical imagery, therefore it will be assumed that a patient is being examined. He is instructed to breathe normally and regularly during the examination. In methods in which no movement compensation is made, he is asked to hold his breath or to stop breathing in the same state before each measurement. He has also ingested a radio-pharmaceutical substance such as FDG (fluoro-deoxy-glucose) by intravenous injection. This substance is used to monitor the cellular metabolism of glucose using an emission technique. Other emissive substances are used for other applications.

Attenuation and emission measurements are made in steps Et1 and Et2 in FIG. 1. For each measurement category, measurement sets are taken at successive instants, which are usually not simultaneous for the two measurement categories. However, a time synchronization of measurement sets is usually necessary, within the two series and between the two series after step Et3. One useful method for achieving this may be to measure a patient movement using an independent sensor such as a breathing sensor, a pressure sensor or an electrocardiogram. Each measurement set is then associated with a determined state of the patient during which a measurement of his movement was made. If this measurement relates to a cyclic phenomenon such as breathing, the measurement sets may be associated with time phases of this movement as suggested in the diagram in FIG. 2, in which six measurement sets M1 to M6 taken over a breathing cycle are associated with average phases φ1 to φ6.

Steps Et11 and Et12 in FIG. 1 illustrate such uses of sensors. Movement or position sensors are usually suitable for this method. There may be an arbitrary number of these sensors. Some may be associated with the attenuation measurements and others with emission measurements. When a measurement set is taken, the associated sensors record the movement signal, etc., that they receive. When all measurement sets have been taken, comparisons between signals recorded by the different sensors may be used to place the two measurement sets at determined locations on a common time scale. Times at which measurements are made may be determined if some sensors also measure the time, or if an independent time measurement signal is taken and measured. In the method illustrated, two time measurement signals are taken at preliminary steps Et13 and Et14, and are used to determine times at which measurements are made with the two techniques, and times at which measurements are made by sensors, respectively.

Finally, the time may be synchronized by correlation processes between image projections. The article entitled "Kymogram detection and Kymogram-correlated image reconstruction from subsecond spiral computed tomography scans of the heart", by Kachelriess et al., Med. Phys. 29 (7), July 2002, p. 1489 to 1503, gives an example.

After these measurement set collection and time synchronisation steps Et1, Et2 and Et3, at least a partial image reconstruction is carried out for the patient by multiple states in steps Et4 and Et5 for each measurement technique. This means that each measurement set such as M1 is used to give a particular image assuming that the patient is motionless throughout the time that the measurement sets are being taken. Conventional digital means such as filtering and back projection are applied. The partial images thus obtained are usually based on data that are too incomplete to be precise, but in any case they are sufficiently detailed so that they can be compared with each other to determine the patient's movements between two phases. For further information, refer to the previous state of the art described by P. Grangeat, A. Koenig, T. Rodet and S. Bonnet in "Theoretical framework for a dynamic cone-beam reconstruction algorithm based on a dynamic particle model", Phys. Med. Biol., vol. 47, No. 15, pp. 2611-2625, August 2002 for an attenuation technique, and D. R Gilland, B. A. Mair, J. E. Bowsher and R. J. Jaszczak, "Simultaneous reconstruction and motion estimation for gated cardiac ECT", IEEE Trans. Nucl. Sci., vol. 49, No. 5, pp. 2344-2349, October 2002, for an emission technique.

Steps Et15 and Et16 show that patient states can also be defined at these same states using information output by the sensors.

Time synchronization could then have been applied to these state images rather than to measurement sets.

Spatial synchronization is undertaken in step Et6. It is an adjustment of at least partial image categories and information from sensors in which corresponding points (in other words points corresponding to the same point on the patient) must appear at the same position on the two image categories. The two image categories are compared with each other in this step that is not innovative, and the invention is not applicable to it.

It consists of determining a deformation operator D defined by parameters to change from a coordinate system associated with the attenuation images to the coordinate system associated with the emission images.

This operator is assumed to be invariable throughout the examination period. It is also assumed that the time synchronization is sufficiently precise and that the patient's movements (physiological) are reproducible.

The result is that at time t, there is an attenuation image $f_t$ and an emission image $g_t$. The next step is to identify the deformation operator D assuming consistency between the two images $f_t$ and $g_t$ on the measurement points.

$$D = \arg \min[E_{ima}(f_t, g_t, D)]$$

where $$E_{ima}(f_t, g_t, D) = \Sigma \phi(f_t(r) - g_t[D(r)])$$

where φ is a convex function and i denotes the position of the pixel in the image.

To be general, measurements obtained by microsystems that provide information about the position of the patient at the sensors (or checkpoints) can also be introduced. Consider the case in which images of the position of these checkpoints are available for each acquisition type (attenuation and emission). These measurement sets output by position sensors are denoted $h^{att}$ and $h^{émi}$. These sensors use optical systems, unlike movement sensors that are based on accelerometer based systems.

It would also be possible to consider using imagery systems to position these sensors by varying their attenuation and incorporating radioactive sources into them for the emission part.

If this additional information $h_t^{att}$ and $h_t^{mi}$ is available at time t, then the complete set can be minimized into a single function.

$$D = \arg \min[E_{ima}(f_t, g_t, D) + \alpha E_{capt}(h_t^{att}, h_t^{émi}, D)]$$

where α is a weighting factor.

Since D is assumed to be constant throughout the examination period, its determination is not limited to a set of images at time t, but it covers all available times.

D may be a solid movement (translation if the patient is not at exactly the same height, rotation if the patient has turned slightly) or for example an affine movement. The deformation D may also be interpreted by analogy to deformation grids of checkpoints using free form deformation techniques.

The simple case is then the case in which the patient does not move between the attenuation and emission techniques and therefore in which D=identity.

The next steps Et7 and Et8 relate to an estimate of the patient's movement between two phases for each of the two measurement categories. Once again, known methods are used, particularly as described in French patent 2 736 454 or the article by Gilland mentioned above. The result is displacement fields of points of the object from one phase to the next. Dense displacement fields may be obtained for attenuation measurements that reproduce details of images very well. In general, they cannot be reproduced with emission measurements; they can be completed using other information (for example from movement sensors located on the patient) or by making assumptions about object movements, such as lack of deformation (movements are reduced to translations and rotations), or a deformation without a volume variation, or a deformation obeying determined parameters. Heart muscle and thorax cage movements can thus be easily used.

Another method of completing displacement fields is more particular to the invention and is particularly important. It relates to cyclic movements such as breathing or heart beats. Attenuation measurements are usually made quickly, in a few breathing cycles or even a single cycle, while emission measurements are made much more, slowly, ten minutes often being necessary. The invention then includes grouping of measurement sets, particularly emission measurements, using the phases φ considered in a single movement cycle, even if these measurements actually concern different cycles. This is illustrated in FIG. 2, in which measurement sets subsequent to the measurements in the previous breathing cycle (M7, M8, etc.) will be associated with phases φ1 and φ2, etc. already mentioned rather than with phases φ7 and φ8, etc., that are deduced by an angle of 2π or a multiple of an angle of 2π. A small number of partial images are richer in contents.

Although this synchronization method using a small number of phases is very practical, it is not essential for use of this invention that can be applied to a patient subjected to an arbitrary movement or a cyclic movement.

Steps Et17 and Et18 illustrate that displacement fields can also be calculated using sensor measurements.

The next step Et9 is one of the most important steps in the invention. It consists of obtaining a displacement field, said to be enhanced, by a combination of two movement estimates Et7 and Et8 obtained previously and possibly using other contributions originating from different measurements or assumptions.

We will now describe the calculation of the enhanced displacement field, this time attempting to be as general as possible.

To be more general, it is also possible to introduce microsystem measurements that would both be obtained either by attenuation or by emission or both, and a deformation operator D configured to make the conversion from the attenuation coordinate system to the emission coordinate system and for movements $m_{att}$ in the attenuation coordinate system and $m_{émi}$ in the PET emission coordinate system, such that $$m_{att}(i) = m_{émi}(D(i)) = m_{émi}oD-(i)$$

The formula to minimize information obtained no longer only by imagery systems, but also by micro-systems providing information about the position and/or movement of the patient at the sensors (or also at checkpoints) is explicitly added.

As explained above, we will consider the case in which a measurement set output by these sensors is available for each attenuation or emission acquisition. However, a distinction is made between the case in which position images output by the sensor are available (used for adjustment).

$$\begin{cases} h_1^{att} & h_2^{att} \\ h_1^{émi} & h_2^{émi} \end{cases} \text{at times } t_1 \text{ and } t_2$$

and the case in which displacement fields are directly available at some points in space (such as checkpoints)

$$\begin{cases} m_{att} \\ m_{émi} \end{cases} \text{between times } t_1 \text{ and } t_2,$$

the two fields being related by the previously determined relation $$m_{att} = m_{émi}oD$$

Finally, an attempt is made to make the following consistency:

$$\text{On medical images} \begin{vmatrix} (f_1, f_2, moD)(g_1, g_2, m) \\ (mf, moD)(mg, m) \end{vmatrix};$$

E1 is a function expressing consistency between two at least partial emission images g1 and g2 obtained in step Et5, and the displacement field m that must relate them, and that can be expressed by E1 (g1, g2, m)=Σφ1[g1(r)−g2(r+m(r))] where φ1 is a convex function and r denotes the position of the pixel considered on the image; E9 is the a priori knowledge about the regularity of the displacement field, for example with E9(m)=Σφg(m(r)); and E3 and E4 reflect the consistency of the displacement field m with respect to estimated displacement fields for the two techniques, using the formulas E3(mg,m)=Σφ3(m(r)−mg(r)) and E4(mF,moD)=Σφ4(moD (r)−mf(r)). Functions φ1, φ2, φ3 and φ4 are chosen fairly freely and may consist of convex positive polynomials, the essential requirement being that it is easy to use digital analysis procedures to find a displacement field m that satisfactorily reconciles existing results and that can thus be applied to at least partial emission images.

In particular, consistency between two attenuation images $f_1$ and $f_2$ obtained in step Et4 and the displacement field m defining a relation between them, is explicitly introduced.

Considering data for micro-systems $$\begin{vmatrix} (h_1^{att} \ h_2^{att}, moD)(h_1^{émi} \ h_2^{émi}, m) \\ (m_{att}, moD)(m_{émi}, m) \end{vmatrix}$$

with some regularity on m.

The set can be minimized in a single function (m,D)=arg min.

$$\begin{cases} aE_1(g_1, g_2, m_{émi}) + bE_2(f_1, f_2, moD) + cE_3(mg, m) + \\ dE_4(mf, moD) + eE_5(h_1^{émi} \ h_2^{émi}, m) + fE_6(h_1^{att} \ h_2^{att}, moD) + \\ gE_7(m_{émi}, m) + hE_8(m_{att}, moD) + iE_9(m) \end{cases}$$

where m, is the enhanced displacement field.

The unknowns are m and the parameters of the deformation D.

This deformation is precisely the deformation required during the spatial synchronization step.

Therefore, it will be possible to separate the problem firstly by identifying D to ensure that ($h_1^{att}$, $h_1^{émi}$, D), ($h_2^{att}$, $h_2^{émi}$, D), etc., are consistent.

This partial minimization has been described above.

As a result, the function then becomes applicable only to the unknown m. Microsystems can perform two roles:
- make the two acquisition techniques correspond to each other;
- remove some ambiguities on the calculation of the displacement and trajectory field for at least one of the two acquisition techniques.

In any case, the use of another reference imagery method remains necessary to compensate for the poor spatial resolution and the mediocre image quality (noisy and defined only in regions in which the radioactive product is fixed) which characterize emission images and would result in poor quality displacement fields for areas of interest.

Failure to use sensors imposes e=f=g=h=0 and the result is a function based only on information obtained using imagery systems.

In the particular case in which there are no position and/or movement sensors, this enhanced displacement field is denoted m, and the displacement fields obtained in steps Et7 and Et8 are denoted mf and mg, and the formula can be simplified and becomes:

M=arg min {aE1(g1,g2,m)+bE2(f1,f2,moD)+cE3(mg, m)+dE4(mF,moD)+iEg(m)}; where a, b, c and d are weighting factors.

One important case corresponds to a=b=d=0: displacement fields estimated by the attenuation technique would then be applied unchanged to partial images estimated by the emission technique; since as mentioned, the displacement field obtained by the attenuation technique is usually much more precise and accurate.

The displacement field calculated in steps Et17 and Et18 can also contribute to the calculation of the displacement field enhanced by the use of other weighting factors. However, it must be emphasized that the use of independent sensors is not essential if the measurement sets can be placed otherwise (in steps Et13 and Et14) in a same time scale; steps Et11 and Et12, Et15, Et16, Et17 and Et18 can then be eliminated from the method.

The method is completed by use of this enhanced displacement field to reconstruct at least a final image of the patient according to step Et10. To achieve this, the partial images are combined by addition, taking account of displacements of their points from one phase to the next so as to make additions only on successive states of the same points. Weighting factors expressing the confidence assigned to each point or to each partial image may be applied. The final image obtained is sharper than the partial images (and composed of entire complete acquisitions of the patient). The improvement achieved with the invention is expressed primarily on the image obtained by emission techniques. However, if the acquisition was long (in other words made over several cycles), a single image is not necessarily reconstructed, instead a series of images is created each corresponding to a state in the breathing cycle (for example), and the estimate of the enhanced displacement fields and movement compensation are applied to these state images. This method reduces the influence of an overall cyclic movement of the patient and can give better quality results than a single image obtained with all measurement sets accumulated during the cycle and that could better reduce the measurements noise compared with the useful signal, but would cause blur due to this overall movement.

Images using the emission technique may be also corrected in a known manner by correction of emission data with or without movement corrections, as a function of the attenuation made to them and that can be deduced from attenuation images.

Attenuation and emission techniques that could be used with the invention include CT (X-ray tomography) and MRI (nuclear magnetic resonance imagery) for attenuation, and SPECT (Single Photon Emission Computed Tomography) or TEP (position emission tomography) for emission.

The use of position and movement micro-sensors may be used with one of the techniques, or it may replace one of them in order to provide a reference on the displacement field to be applied finally on the images obtained by emission techniques.

The advantage of the invention is obvious for pairs of measurements including an attenuation technique and a radiation emission technique, but it can also be applied to other double measurement situations.

The invention claimed is:

1. A method of forming an image of a mobile object, comprising:
   obtaining a plurality of first images of the mobile object using a first imaging technique while obtaining a plurality of first measurements corresponding to movements of the mobile object using a first sensor system, the first sensor system being independent from the first imaging technique;
   associating the plurality of first images with first movement states of the mobile object using the first measurements;
   obtaining a plurality of second images of the mobile object using a second imaging technique while obtaining a plurality of second measurements corresponding to movements of the mobile object using a second sensor system, the second sensor system being independent from the second imaging technique;
   associating the plurality of second images with second movement states of the mobile object using the first measurements; and
   forming an image of the mobile object based on said plurality of first images, said associated plurality of first movement measurements, and said first movement states and on said plurality of second images, said associated plurality of second movement measurements, and said second movement states,
   wherein the first imaging technique is different from the second imaging technique.

2. The method of claim 1, further comprising:
   time-synchronizing said first plurality of images and said second plurality of images to a common time scale based on the first and second movement states.

3. The method of claim 1, further comprising:
   forming first reconstructed images corresponding to said plurality of first images and second reconstructed images corresponding to said plurality of second images.

4. The method of claim 3, further comprising:
   spatially-synchronizing said first reconstructed images and said second reconstructed images.

5. The method of claim 1, wherein said first imaging technique is a radiation attenuation technique and said second imaging technique is a radiation emission technique.

6. The method of claim 1, further comprising:
   spatially-synchronizing the plurality of first images and the plurality of second images using said plurality of first measurements and said plurality of second measurements.

7. The method of claim 1, further comprising:
   forming displacement fields corresponding, respectively, to said plurality of first images, said plurality of first measurements, said plurality of second images, and said plurality of second measurements.

8. The method of claim 7, wherein said forming an image of the mobile object comprises combining said displacement fields.

9. The method of claim 7, wherein said forming displacement fields comprises:
   estimating movement of the mobile object based, respectively, on said plurality of first images, said plurality of second images, said plurality of first measurements, and said plurality of second measurements, in order to form said displacement fields.

10. The method of claim 9, wherein at least one of said movement estimates is formed relative to a reference time.

11. The method of claim 1, wherein the first sensor system is different from the second sensor system.

12. An apparatus to form an image of a mobile object, comprising:
- means for obtaining a plurality of first images of the mobile object using a first imaging technique;
- means for obtaining a plurality of first measurements corresponding to movements of the mobile object while obtaining the plurality of first images, the means for obtaining the plurality of first measurements being independent from the first imaging technique;
- means for associating the plurality of first images with first movement states of the mobile object, the first movement states being determined by the first measurements;
- means for obtaining a plurality of second images of the mobile object using a second imaging technique;
- means for obtaining a plurality of second measurements corresponding to movements of the mobile object while obtaining the plurality of second images, the means for obtaining the plurality of second measurements being independent from the second imaging technique;
- means for associating the plurality of second images with second movement states of the mobile object, the second movement states being determined by the second measurements; and
- means for forming an image of the mobile object based on said plurality of first images, said associated plurality of first measurements, and said first movement states and on said plurality of said second images, said associated plurality of second measurements, and said second movement states, wherein the first imaging technique is different from the second imaging technique.

13. The apparatus of claim 12, further comprising:
- means for forming first reconstructed images corresponding to said plurality of first images and second reconstructed images corresponding to said plurality of second images.

14. The apparatus of claim 12, wherein said first imaging technique is a radiation attenuation technique and said second imaging technique is a radiation emission technique.

15. The apparatus of claim 12, further comprising:
- means for forming displacement fields corresponding, respectively, to said plurality of first images, said plurality of first measurements, said plurality of second images, and said plurality of second measurements.

16. The apparatus of claim 15, wherein said means for forming an image of the mobile object comprises means for combining said displacement fields.

17. The apparatus of claim 15, wherein said means for forming displacement fields comprises:
- means for estimating movement of the mobile object based, respectively, on said plurality of first images, said plurality of second images, said plurality of first measurements, and said plurality of second measurements, in order to form said displacement fields.

18. The apparatus of claim 17, wherein at least one of said movement estimates is to be formed relative to a reference time.

* * * * *

UNITED STATES PATENT AND TRADEMARK OFFICE
CERTIFICATE OF CORRECTION

PATENT NO. : 8,265,353 B2
APPLICATION NO. : 10/955037
DATED : September 11, 2012
INVENTOR(S) : Bonnet et al.

It is certified that error appears in the above-identified patent and that said Letters Patent is hereby corrected as shown below:

In the Specifications:

In Column 1, Line 7, delete "synchronisation." and insert -- synchronization. --, therefor.

In Column 2, Line 7, delete "below" and insert -- below. --, therefor.

In Column 3, Lines 27-28, delete "synchronisation" and insert -- synchronization --, therefor.

In Column 4, Line 28, delete "$h_t^{mi}$" and insert -- $h_t^{émi}$ --, therefor.

In Column 6, Lines 31-33, delete "$(h_1^{att}\ h_2^{att}, moD)(h_1^{émi}\ h_2^{émi}, m)$ $(m_{att}, moD)(m_{émi}, m)$" and insert -- $(h_1^{att}, h_2^{att}, moD)\ (h_1^{émi}, h_2^{émi}, m)$ $(m_{att}, moD)\ (m_{émi}, m)$ --, therefor.

In Column 6, Lines 40-42, delete "$\{aE_1(g_1, g_2, m_{émi}) + bE_2(f_1, f_2, moD) + cE_3(mg, m) + dE_4(mf, moD) + eE_5(h_1^{émi}\ h_2^{émi}, m) + fE_6(h_1^{att}\ h_2^{att}, moD) + gE_7(m_{émi}, m) + hE_8(m_{att}, moD) + iE_9(m)\}$" and insert -- $\{a\ E_1(g_1, g_2, m_{émi}) + b\ E_2(f_1, f_2, moD) + c\ E_3(mg, m) + d\ E_4(mf, moD) + e\ E_5(h_1^{émi}, h_2^{émi}, m) + f\ E_6(h_1^{att}, h_2^{att}, moD) + g\ E_7(m_{émi}, m) + h\ E_8(m_{att}, moD) + i\ E_9(m)\}$ --, therefor.

In Column 7, Line 58, delete "TEP" and insert -- PET --, therefor.

Signed and Sealed this
Twenty-first Day of May, 2013

Teresa Stanek Rea
*Acting Director of the United States Patent and Trademark Office*

CERTIFICATE OF CORRECTION (continued)
U.S. Pat. No. 8,265,353 B2

In the Claims:

In Column 8, Line 11, in Claim 1, delete "object using" and insert -- object, the first movement states being determined by --, therefor.

In Column 8, Line 23, in Claim 1, delete "movement measurements," and insert -- measurements, --, therefor.

In Column 8, Line 25, in Claim 1, delete "movement measurements," and insert -- measurements, --, therefor.

In Column 8, Lines 31-32, in Claim 2, delete "scale based on" and insert -- scale, the common time scale being determined by a comparison between --, therefor.